(12) United States Patent
Wilmot

(10) Patent No.: US 8,854,845 B2
(45) Date of Patent: Oct. 7, 2014

(54) SYSTEM AND METHOD OF OVER-VOLTAGE PROTECTION

(71) Applicant: General Electric Company, Schenectady, NY (US)

(72) Inventor: Theodore Steven Wilmot, Laurens, SC (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 13/669,806

(22) Filed: Nov. 6, 2012

(65) Prior Publication Data

US 2014/0126255 A1     May 8, 2014

(51) Int. Cl.
*H02M 1/32*     (2007.01)

(52) U.S. Cl.
USPC .............................. 363/51; 323/329; 361/91.6

(58) Field of Classification Search
CPC ....... H02M 1/32; H02M 1/16; H02M 7/1216; H02M 2001/322
USPC .................... 363/51, 55, 56.01, 56.02, 56.05; 323/329; 361/91.6
See application file for complete search history.

(56) References Cited

U.S. PATENT DOCUMENTS

| | | | | |
|---|---|---|---|---|
| 3,624,405 A | * | 11/1971 | Bishop et al. | 307/33 |
| 4,103,324 A | * | 7/1978 | Vandervelden et al. | 363/89 |
| 2010/0091417 A1 | | 4/2010 | Letas | |
| 2013/0301167 A1 | * | 11/2013 | Langel | 361/21 |

* cited by examiner

*Primary Examiner* — Harry Behm
(74) *Attorney, Agent, or Firm* — Ernest G. Cusick; Frank A. Landgraff

(57) ABSTRACT

In one aspect, a method for over-voltage protection is provided. The method includes connecting a first winding of a saturable reactor to a direct current (DC) source; connecting at least one phase of an alternating current (AC) electrical system to ground through a second winding of the saturable reactor; and controlling DC current flow from the DC source to the first winding of the saturable reactor in response to an over-voltage event, wherein energy is shunted to ground from the at least one phase of the alternating current electrical system through the second winding of the saturable reactor.

20 Claims, 3 Drawing Sheets

SYSTEM AND METHOD OF OVER-VOLTAGE PROTECTION

FIELD OF THE INVENTION

The present subject matter relates generally to electrical machines and, more particularly, to a system and method for protecting one or more electrical machines during from an over-voltage event.

BACKGROUND OF THE INVENTION

Generally, a wind turbine generator includes a turbine that has a rotor that includes a rotatable hub assembly having multiple blades. The blades transform mechanical wind energy into a mechanical rotational torque that drives one or more generators via the rotor. The generators are generally, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower.

Some wind turbine generator configurations include doubly fed induction generators (DFIGs). Such configurations may also include power converters that are used to transmit generator excitation power to a wound generator rotor from one of the connections to the electric utility grid connection. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Similar to wind generation, solar power generation is becoming a progressively larger source of energy throughout the world. Solar power generation systems typically include one or more photovoltaic arrays (PV arrays) having multiple interconnected solar cells that convert solar energy into DC power through the photovoltaic effect. In order to interface the output of the PV arrays to a utility grid, a solar converter is needed to change the DC current and DC voltage output of the PV array into a 60/50 Hz AC current waveform that feeds power to the utility grid.

Various solar power converters exist for interfacing the DC output of a PV array into AC power. One implementation of a solar power converter consists of two stages, a boost converter stage and an inverter stage. The boost converter controls the flow of DC power from the PV array onto a DC bus. The inverter converts the power supplied to the DC bus into an AC current and AC voltage that can be output to the AC grid.

In some instances, power conversion devices such as the wind turbine generators and solar power generators described above, and other sources of power generation, may be located in remote areas far from the loads they serve. Typically, these power conversion devices are connected to the electrical grid through an electrical system such as long transmission lines. These transmission lines are connected to the grid using one or more breakers. In some instances, a grid fault can occur on these electrical systems. Such grid faults may cause high voltage events, low voltage events, zero voltage events, and the like, that may detrimentally affect the one or more electrical machines such as power conversion devices if protective actions are not taken. In some instances, these grid faults can be caused by opening of one or more phase conductors of the electrical system resulting in islanding of at least one of the one or more electrical machines. Islanding of these electrical machines by sudden tripping of the transmission line breaker at the grid side or otherwise opening these transmission lines while the source of generation is under heavy load may result in an overvoltage on the transmission line that can lead to damage to the source of generation or equipment associated with the source of generation such as converters and inverters. Islanding generally requires disconnecting at least a portion of the affected one or more electrical machines from the electrical system to prevent damaging the electrical machine or equipment associated with the electrical machine. However, in other instances, the grid fault may not be islanding and may be a short term aberration to the electrical system. In these instances, it is desirous to keep the affected electrical machines connected to the electrical system and to institute ride-through procedures such as, for example, high voltage ride through (HVRT), low voltage ride through (LVRT) and zero voltage ride through (ZVRT). Exemplary systems and methods for HVRT, ZVRT and LVRT are described in U.S. Patent Publication U.S. 20120133343 A1 (application Ser. No. 13/323,309) filed Dec. 12, 2011; U.S. Pat. No. 7,321,221 issued Jan. 22, 2008; and U.S. Pat. No. 6,921,985 issued Jul. 26, 2005, respectively, which are fully incorporated herein by reference and made a part hereof.

Failure to properly detect and manage the occurrence of over-voltage events in wind turbine generator converters, solar converters, other power conversion devices or electrical machines can be very damaging to those systems. Accordingly, an improved system and/or method that provides for protecting one or more electrical machines during an over-voltage event would be welcomed in the technology.

BRIEF DESCRIPTION OF THE INVENTION

In one aspect, a method for over-voltage protection in a power conversion device is provided. The method includes connecting a first (e.g., tertiary) winding of a saturable reactor to a direct current (DC) source; connecting at least one phase of an alternating current (AC) electrical system to ground through a second (e.g., primary) winding of the saturable reactor; and controlling DC current flow from the DC source to the first winding of the saturable reactor in response to an over-voltage event, wherein energy is shunted to ground from the at least one phase of the alternating current electrical system through the second winding of the saturable reactor.

In another aspect, a system for over-voltage protection in a power conversion device is described. One embodiment of the system includes a saturable reactor having at least a first (e.g., tertiary) winding, a core, and a second (e.g., primary) winding; a direct current (DC) source, wherein the first winding of the saturable reactor is connected to the DC source; an alternating current (AC) electrical system, wherein at least one phase of the AC electrical system is connected to ground through the second winding of the saturable reactor; and one or more control devices, wherein the one or more control devices are used to control DC current flow from the DC source to the first winding of the saturable reactor in response to an over-voltage event, wherein energy is shunted to ground from the at least one phase of the alternating current electrical system through the second winding of the saturable reactor.

In yet another aspect, a system for over-voltage protection is described. One embodiment of the system includes a saturable reactor having at least a primary winding, a core, and a tertiary winding; a direct current (DC) source, wherein the tertiary winding of the saturable reactor is connected to the DC source; an alternating current (AC) electrical system, wherein at least one phase of the AC electrical system is connected to ground through the primary winding of the saturable reactor; and a breakover device and a switching device, wherein the breakover device triggers the switching device to cause the DC current flow from the DC source through the tertiary winding of the saturable reactor in response to an over-voltage event, wherein the DC current flow through the tertiary winding of the saturable reactor saturates a core of the saturable reactor causing energy to be shunted to ground from the at least one phase of the alternating current electrical system through the primary winding of the saturable reactor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of embodiments of the present invention, including the best mode thereof, directed to one of ordinary skill in the art, is set forth in the specification, which makes reference to the appended figures, in which.

DETAILED DESCRIPTION OF THE INVENTION

Figure 1:
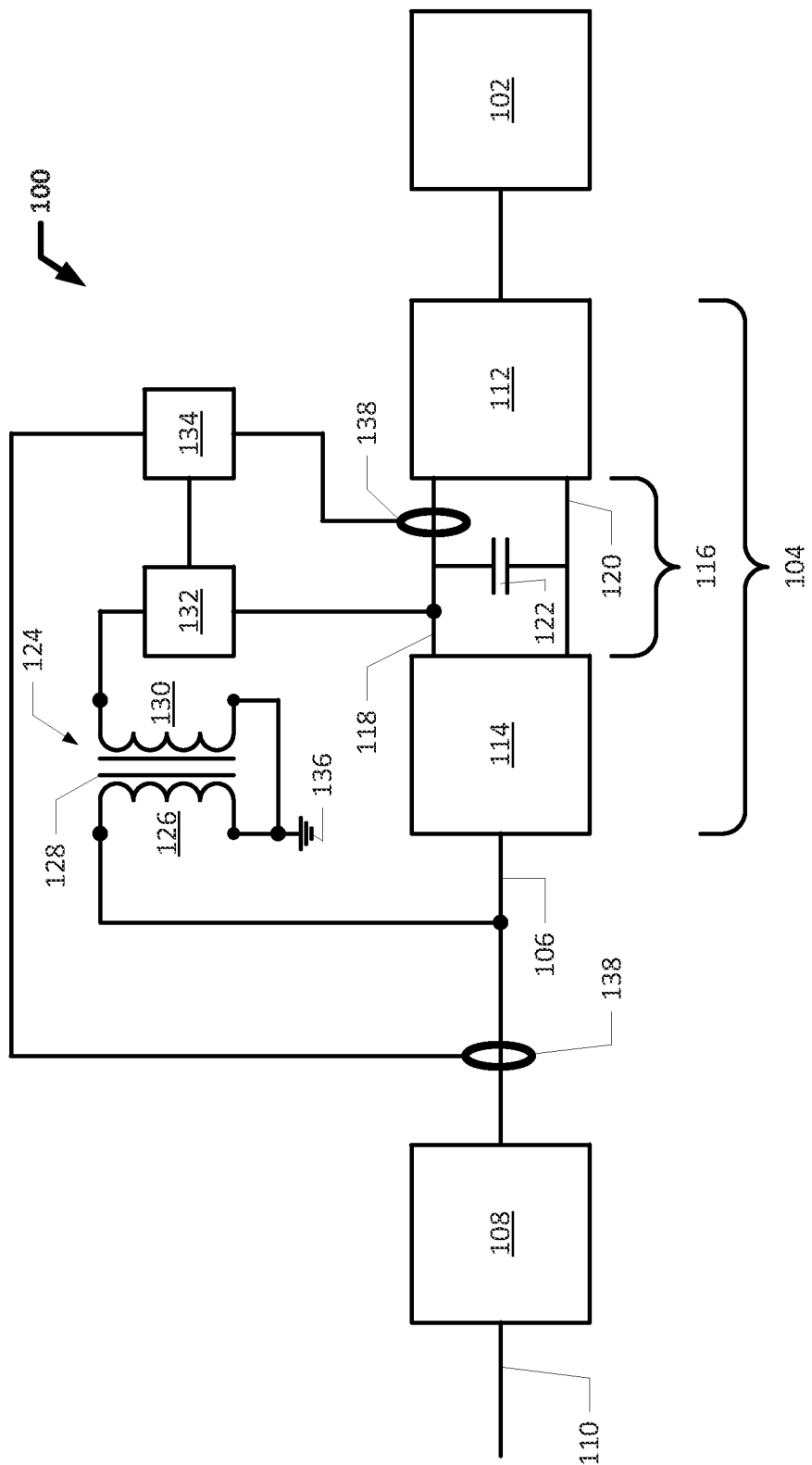
FIG. 1 is a simplified schematic view of an exemplary electrical system that can benefit from embodiments of the present invention.

Before the present methods and systems are disclosed and described, it is to be understood that the methods and systems are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Generally disclosed herein are systems and methods of protecting one or more electrical machines during an over-voltage on an electrical system connected with the one or more electrical machines. Such electrical machines can include, for example, electric motors, electric generators including, for example, wind turbine generators, solar/photovoltaic generation, and the like, and any ancillary equipment associated with such electric machines. In one aspect, embodiments of the present invention disclose systems and methods to control a saturable reactor during an over-voltage condition such that direct current (DC) current flows through a first (e.g., tertiary) winding of the saturable reactor, saturating the core, and allowing energy from one or more phases of an alternating current (AC) electrical system connected to a second (e.g., primary) winding of the saturable reactor to shunt to ground thereby alleviating the over-voltage condition.

FIG. 1 is a simplified schematic view of an exemplary electrical system 100 that can benefit from embodiments of the present invention. This embodiment of an electrical system 100 is comprised of a power generation source 102, a converter 104, an AC bus 106, a transformer 108, and a utility grid 110. The power generation source 102 can be, for example, a wind turbine generator, a photo-voltaic (PV) array, and the like. The converter 104 can be, for example, a bi-directional power conversion assembly as typically, though not limited to, use with a doubly-fed induction generator (DFIG), a full power conversion system as known in the art, and the like. The converter 104 can also be an exemplary two stage power converter used to convert DC power from a PV array into AC power suitable for feeding the AC power bus 106.

The converter 104 can be further comprised of a first device 112, a second device 114, and a DC link 116 connecting the first device 112 and the second device 114. In one aspect, the first device 112 can comprise a rotor-side, bi-directional power converter that is electrically coupled via the DC link 116 to the second device 114, a line-side, bi-directional power converter. In this aspect, converters 112 and 114 can be configured in a three-phase, pulse width modulation (PWM)

configuration including insulated gate bipolar transistor (IGBT) switching devices (not shown in FIG. 1) that are modulated to create a sinusoidal waveform of suitable frequency and amplitude as is known in the art. Alternatively, converters 112 and 114 have any configuration using any switching devices that facilitate operation of system 100 as described herein. In one aspect, converter assembly 104 can be coupled in electronic data communication with a controller 134, as further described herein, to control the operation of converters 112 and 114. In another aspect, converter 104 first device 112 can comprise a DC to DC converter, such as a boost converter, that outputs DC power onto the DC link 116. The second device 114 of the power converter 104 can be an inverter that converts the DC power on the DC link 116 to AC power suitable for being fed to the AC power bus 106. DC link 116 can include a positive rail 118 and a negative rail 120. In one aspect, DC link 116 can further include at least one capacitor 122 coupled therebetween. Alternatively, capacitor 122 can be one or more capacitors configured in series or in parallel between rails 118 and 120. As further shown in FIG. 1, a transformer 108 connects the AC bus 106 with the utility grid 110. Generally, transformer 108 can be a poly-phase transformer or one or more single-phase transformers. In one aspect, transformer 108 is configured as a three-phase delta (utility grid 110 side)—grounded wye (AC bus 106 side), though other winding and phase configurations are contemplated within the scope of embodiments of the invention. Generally, though not limited to, the utility grid 110 side of the transformer 108 will be at a higher voltage than the AC bus 106 side of the transformer 108. The electrical system 100 may be further comprised of various other devices, apparatus and mechanisms such as breakers, switches, transformers, motors, control electronics, transducers, sensors, capacitors, inductors, resistors and the like that are known in the art but not shown for clarity purposes in FIG. 1.

Further comprising the electrical system 100 of FIG. 1 is an embodiment of a system for over-voltage protection. In one aspect, the over-voltage protection system comprises a saturable reactor 124. One embodiment of the saturable reactor 124 comprises at least a primary winding 126, a core 128, and a tertiary winding 130, though other embodiments of saturable reactors, as known in the art, are contemplated within the scope of embodiments of this invention. As shown in FIG. 1, one side of the tertiary winding 130 of the saturable reactor 124 is connected to a DC source such as the DC link 116 of the converter 104. The other side of the tertiary winding 130 is connected to ground 136. At least one phase of the AC bus 106 is connected to ground 136 through the primary winding 126 of the saturable reactor 124. Further comprising the embodiment of an over-voltage protection system are one or more control devices 132. The one or more control devices 132 can be used to control the flow of DC current from the DC source such as the DC link 116 of the converter 104 through the tertiary winding 130 of the saturable reactor 124 in response to an over-voltage event. In one aspect, the over-voltage event can be detected at the utility grid 110. In another aspect, the over-voltage event can be detected at the AC bus 106. In yet another aspect, the over-voltage event can be detected at the DC link 116, or any other suitable location of the electrical system 100. The over-voltage event can be any voltage over the expected nominal voltage at the location being monitored. For example, the over-voltage event can be 105%, 110%, 115%, 120%, 140% and the like of the nominal expected voltage. In one non-limiting example, the one or more control devices 132 allow current to flow from the DC source such as the DC link 116 of the converter 104 through the tertiary winding 130 of the saturable reactor 124 in response to a voltage of 130% or greater of nominal voltage. The DC current flow through the tertiary winding 130 of the saturable reactor 124 saturates the core 128 of the saturable reactor 124. This saturation reduces the reactance of the primary winding 126 effectively from the iron core inductance to the air core inductance, thus allowing energy to be shunted to ground 136 from the at least one phase of the AC bus 106 through the primary winding 126 of the saturable reactor 124, thereby protecting the power generation source 102, converter 104, and other components of the electrical system 100. Furthermore, when the DC source comprises the DC link 116, using energy from the DC link 116 to saturate the core 128 of the saturable reactor 124, energy is dissipated from the DC link 116 thus helping protect the components of the converter 104. In one aspect, the one or more control devices 132 can comprise one or more electronic devices such as breakover devices (e.g. Zener diodes, etc.), electronic switches (e.g., metal oxide field effect transistors (MOSFETs), IGBTs, silicon controlled rectifiers (SCRs), gate turn-off (GTO) thyristors, gate-commutated thyristors (GCT), combinations thereof, and the like). In another aspect, the one or more control devices 132 can be controlled by a controller 134. Controller 134 can receive input from sensors 138 located throughout the electrical system 100 such as at the DC link 116, the AC bus 106, the utility grid 110 (not shown) and any other suitable location. The sensor 138 can be used to detect operational conditions of the electrical system 100 such as, for example, an over-voltage event. Once a condition of an abnormality, such as but not limited to an over-voltage event, on the electrical system 100 is sensed by the sensors 138, an input can be sent to the controller 134. The controller 134 can then cause the one or more control devices 132 to allow the flow of DC current from the DC source such as the DC link 116 of the converter 104 through the tertiary winding 130 of the saturable reactor 124 in response to the detected abnormality, resulting in energy being shunted to ground 136 from the at least one phase of the AC bus 106 through the primary winding 126 of the saturable reactor 124. Once the abnormality has cleared, the controller 134 can cause the one or more control devices 132 to reduce or cut off the flow of DC current from the DC source such as the DC link 116 of the converter 104 through the tertiary winding 130 of the saturable reactor 124, thus reducing or halting the shunting of energy to ground 136 from the at least one phase of the AC bus 106 through the primary winding 126 of the saturable reactor 124.

As noted above, embodiments of the over-voltage protection system can include a controller 134. Controller 134 can be used to control operation of the saturable reactor 124 as well as various components of the electrical system such as converter 104. Controller 134 can include at least one processor and a memory, at least one processor input channel, at least one processor output channel, and may include at least one computer (none shown in FIG. 1). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 1), and these terms are used interchangeably herein. In the exemplary embodiment, memory may include, but is not limited to, a computer-readable medium, such as a random access memory (RAM) (none shown in FIG. 1). Alternatively, a floppy disk, a compact disc-read only memory (CD-ROM), a magneto-optical disk (MOD), and/or a digital versatile disc (DVD) (none shown in FIG. 1) may also be used. Also, in the exemplary embodiment, additional input channels (not shown in FIG. 1) may be, but not be limited to, computer peripherals associated with an operator interface such as a mouse and a keyboard (neither shown in FIG. 1). Alternatively, other computer peripherals may also be used that may include, for example, but not be limited to, a scanner (not shown in FIG. 1). Furthermore, in the exemplary embodiment, additional output channels may include, but not be limited to, an operator interface monitor (not shown in FIG. 1).

Processors for controller 134 process information transmitted from a plurality of electrical and electronic devices that may include, but not be limited to, speed and power transducers, current transformers and/or current transducers, breaker position indicators, potential transformers and/or voltage transducers, and the like. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Figure 2:
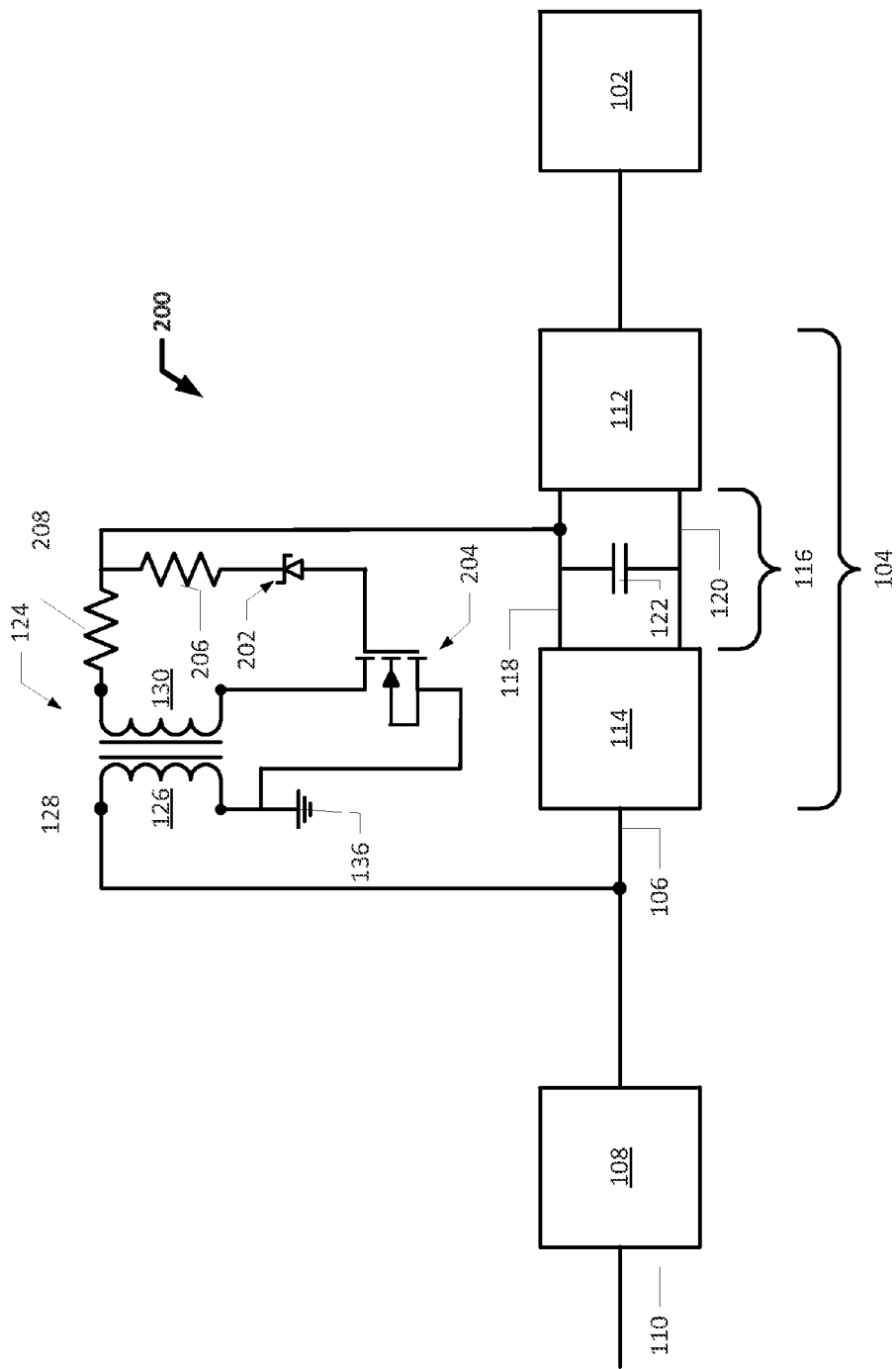
FIG. 2 illustrates an alternate embodiment to the electrical system shown in FIG. 1.

FIG. 2 illustrates an alternate embodiment to the electrical system shown in FIG. 1. In the electrical system 200 of FIG. 2, a controller is not used. A breakover device 202, such as a Zener diode, can be used to trigger a switching device (e.g. an IGBT) 204 to provide DC current to the tertiary winding 130 of the saturable reactor 124. In-rush current can be limited by a series impedance 206 or other suitable device once the breakover device 202 begins conducting. Similarly, DC current flow to the tertiary winding 126 can be limited by a series impedance 208 or similar device and adjusted to ensure saturation of the core 124. During the conduction period caused by saturation of the core 124, energy can be shunt to ground 136 from the at least one phase of the AC bus 106 through the primary winding 126 of the saturable reactor 124 thereby protecting the power generation source 102, converter 104, and other components of the electrical system 200. Furthermore, if the DC source used to provide DC current to the tertiary winding 130 of the saturable reactor 124 is the DC link 116, then by using energy from the DC link 116 to saturate the core 124 of the saturable reactor 124, energy is dissipated from the DC link 116 thus helping protect the components of the converter 104. Once the voltage drops below the breakover level, breakover device 202 can stop conducting thus reducing or halting the shunting of energy to ground 136 from the at least one phase of the AC bus 106 through the primary winding 126 of the saturable reactor 124. It will be appreciated by those skilled in the art that the means of activating the saturable reactor could range from the simple breakover device network shown up to a complex microprocessor or DSP based control system and any variations thereof.

Figure 3:
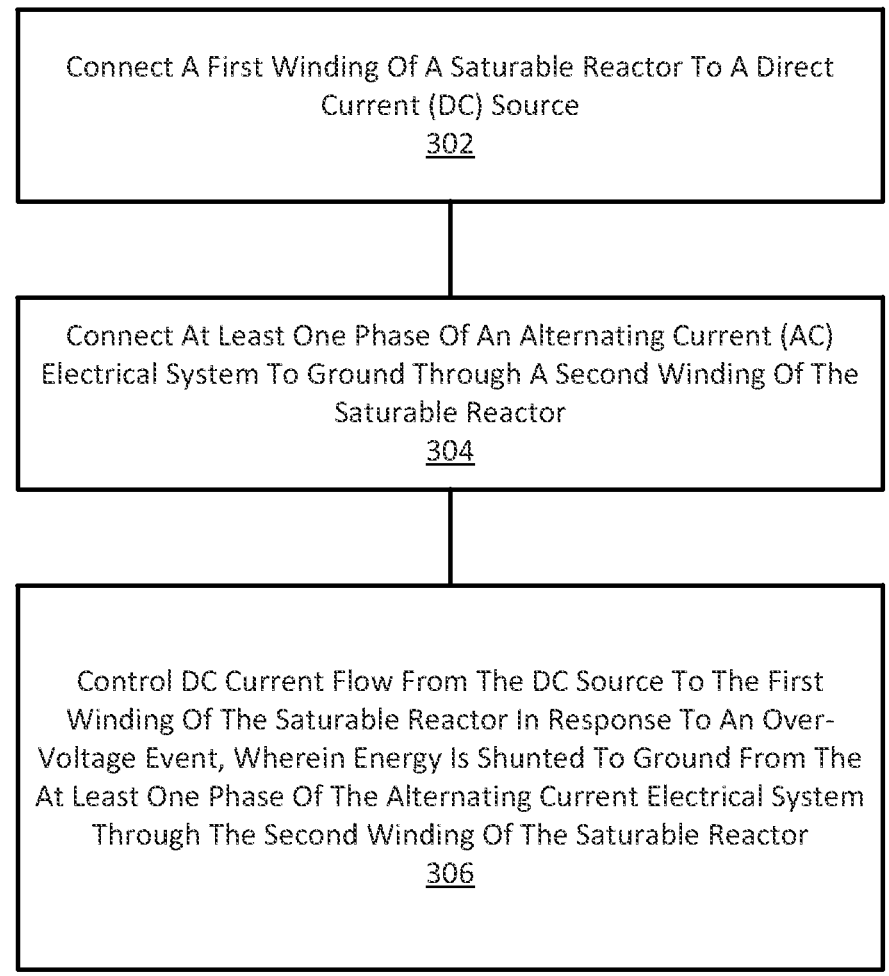
FIG. 3 is a flowchart illustrating an embodiment of a method of over-voltage protection.

FIG. 3 is a flowchart illustrating an embodiment of a method of over-voltage protection. In one aspect, steps or portions of the steps of the method described in FIG. 3 can be performed by one or more computing devices such as controller 134. At step 302, a first winding of a saturable reactor is connected to a DC source. In one aspect, the first winding can comprise a tertiary winding of a saturable reactor. In one aspect, the DC source can comprise a DC link of a converter. In one aspect, the DC link can further comprise one or more capacitors. In various aspects, the converter can comprise a converter for a doubly-fed induction generator used in a wind turbine, a two-stage converter for a solar power installation, and the like. At step 304, at least one phase of an AC electrical system is connected to ground through primary second winding of a saturable reactor. In one aspect, the second winding is a primary winding of a saturable reactor. In one aspect, the AC electrical system comprises a Y-connected poly-phase electrical system. At step 306, DC current flow from the DC source to the first winding of the saturable reactor is controlled in response to an over-voltage event. The DC current flow through the first winding of the saturable reactor saturates a core of the saturable reactor causing energy to be shunted to ground from the at least one phase of the alternating current electrical system through the second winding of the saturable reactor. In one aspect, controlling DC current flow from the DC source through the first winding of the saturable reactor in response to the over-voltage event comprises causing a breakover device to trigger a switching device to cause the DC current to flow from the DC source to the first winding of the saturable reactor in response to the over-voltage event. In one aspect, the breakover device comprises a Zener diode and the switching device comprises an insulated gate bipolar transistor (IGBT). In one aspect, controlling DC current flow from the DC source to the first winding of the saturable reactor in response to the over-voltage event comprises controlling DC current flow from the DC source to the first winding of the saturable reactor in response to a voltage of 140 percent or greater of nominal voltage. In one aspect, the over-voltage event is detected on the DC link of the converter. In another aspect, the over-voltage event is detected on the AC electrical system.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) discussed above with reference to the controller 134, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) discussed above with reference to the controller 134) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of over-voltage protection, comprising:
   connecting a first winding of a saturable reactor to a direct current (DC) source;
   connecting at least one phase of an alternating current (AC) electrical system to ground through a second winding of the saturable reactor; and
   controlling DC current flow from the DC source to the first winding of the saturable reactor in response to an over-voltage event, wherein energy is shunted to ground from the at least one phase of the AC electrical system through the second winding of the saturable reactor.

2. The method of claim 1, wherein the DC source comprises a DC link of a converter.

3. The method of claim 2, wherein the DC link further comprises one or more capacitors.

4. The method of claim 2, wherein the over-voltage event is detected on the DC link or the over-voltage event is detected on the AC electrical system.

5. The method of claim 2, wherein the converter comprises a converter for a doubly-fed induction generator used in a wind turbine or the converter comprises a two-stage converter for a solar power installation.

6. The method of claim 1, wherein the AC electrical system comprises a Y-connected poly-phase electrical system.

7. The method of claim 1, wherein controlling DC current flow from the DC source to the first winding of the saturable reactor in response to the over-voltage event comprises causing a breakover device to trigger a switching device to cause the DC current to flow from the DC source through the first winding of the saturable reactor in response to the over-voltage event.

8. The method of claim 7, wherein the breakover device comprises a Zener diode and the switching device comprises an insulated gate bipolar transistor (IGBT).

9. The method of claim 1, wherein controlling DC current flow from the DC source to the first winding of the saturable reactor in response to the over-voltage event comprises controlling DC current flow from the DC source through the first winding of the saturable reactor in response to a voltage of 140 percent or greater of nominal voltage.

10. A system for over-voltage protection, said system comprising:
    a saturable reactor having at least a first winding, a core, and a second winding;
    a direct current (DC) source, wherein the first winding of the saturable reactor is connected to the DC source;
    an alternating current (AC) electrical system, wherein at least one phase of the AC electrical system is connected to ground through the second winding of the saturable reactor; and
    one or more control devices, wherein the one or more control devices are used to control DC current flow from the DC source to the first winding of the saturable reactor in response to an over-voltage event, causing energy to be shunted to ground from the at least one phase of the alternating current electrical system through the second winding of the saturable reactor.

11. The system of claim 10, wherein the DC source comprises a DC link of a converter.

12. The system of claim 11, wherein the converter comprises a converter for a doubly-fed induction generator used in a wind turbine or the converter comprises a two-stage converter for a solar power installation.

13. The system of claim 10, wherein the DC link further comprises one or more capacitors.

14. The system of claim 10, wherein the AC electrical system comprises a Y-connected poly-phase electrical system.

15. The system of claim 10, further comprising a breakover device and a trigger switching device, wherein controlling DC current flow from the DC source to the first winding of the saturable reactor in response to the over-voltage event comprises causing the breakover device to trigger the switching device to cause the DC current to flow from the DC source through the first winding of the saturable reactor in response to the over-voltage event.

16. The system of claim 15, wherein the breakover device comprises a Zener diode and the switching device comprises an insulated gate bipolar transistor (IGBT).

17. The system of claim 10 further comprising a controller operably connected to the one or more control devices, wherein the controller causes the one or more control devices to allow DC current to flow from the DC source through the first winding of the saturable reactor in response to the over-voltage event.

18. The system of claim 17, further comprising one or more sensors operably connected with the controller, wherein the over-voltage event is detected on the DC link or the over-voltage event is detected on the AC electrical system by the one or more sensors, said sensors providing an input to the controller and said controller controlling the one or more control devices.

19. The system of claim 10, wherein the overvoltage event comprises a voltage of 140 percent or greater of nominal voltage.

20. A system for over-voltage protection, said system comprising:
- a saturable reactor having at least a primary winding, a core, and a tertiary winding;
- a converter having a direct current (DC) link, wherein the tertiary winding of the saturable reactor is connected to the DC link of the converter;
- an alternating current (AC) electrical system, wherein at least one phase of the AC electrical system is connected to ground through the primary winding of the saturable reactor; and
- a breakover device and a switching device, wherein the breakover device triggers the switching device to cause the DC current flow from the DC link of the converter through the tertiary winding of the saturable reactor in response to an over-voltage event, wherein the DC current flow through the tertiary winding of the saturable reactor saturates a core of the saturable reactor causing energy to be shunted to ground from the at least one phase of the alternating current electrical system through the primary winding of the saturable reactor.

* * * * *